United States Patent Office

3,582,512
Patented June 1, 1971

3,582,512
STABLE OPACIFYING LATICES
Joel Fantl, Springfield, Mass., and David N. St. John, Berkeley Heights, N.J., assignors to Monsanto Company, St. Louis, Mo.
No Drawing. Continuation-in-part of abandoned application Ser. No. 535,689, Mar. 21, 1966. This application Apr. 2, 1969, Ser. No. 812,852
Int. Cl. C08d 7/00; C09d 5/02; C11d 1/00
U.S. Cl. 260—29.7
8 Claims

ABSTRACT OF THE DISCLOSURE

Latex compositions for use as opacifiers and comprising the interpolymerization product of (A) at least one monovinylidene aromatic hydrocarbon, (B) at least one alpha, beta-ethylenically unsaturated carboxylic acid and (C) at least one compound having two olefinic groups non-conjugated to each other, wherein the polymer particles of the latex comprise 60 to 90 weight percent of an inner polymer composition and from 40 to 10 weight percent of an outer polymer composition oriented to the surface of the particles; said inner polymer composition being a polymer of from 65 to 100 mol percent of (A), from zero to 3 mol percent of (C) with the remainder if any being (B); said outer polymer composition being an interpolymer of from 24 to 70 mol percent of (B) and from 0.6 to 3.0 mol percent of (C) with the balance being (A).

RELATED APPLICATION

This application is a continuation-in-part of copending application Ser. No. 535,689, filed Mar. 21, 1966, now abandoned.

BACKGROUND

This invention relates to novel polymeric latices and more particularly relates to polymeric latices suitable for use in opacifying liquid detergents, hair creams, etc., which are to be maintained at a pH of from about 2 to about 11.

It is known that clear, liquid detergents, hair creams, floor waxes, etc., which are maintained at an alkaline pH can be opacified by adding certain polymeric latices thereto, that the opacified detergents have a milky, smooth appearance which is generally regarded as aesthetically superior to the appearance of clear detergents, and that best results in opacifying the detergents are obtained when the polymeric latices have a large particle size, i.e., at least about 0.2 micron in diameter. Difficulties have been encountered in achieving comparable opacification of products over a wide pH range, e.g., 2–11. Polymeric latices which are suitable for opacifying the more alkaline liquids are unstable in liquids in the acidic pH range, and polymeric latices having a large particle size are also usually unstable in these detergents which are to be opacified.

An object of this invention is to provide novel polymeric latices.

Another object is to provide polymeric latices suitable for use in opacifying products which are to be maintained over a pH range of from 2 to 11.

Another object is to provide polymeric latices having an average particle size of about 0.05–0.5 micron in diameter and suitable for use in opacifying liquid detergents which are to be maintained over a pH range of from 2 to 11.

A further object is to provide a process for preparing these polymeric latices.

Other objects and advantages of the invention will be apparent from the following detailed description thereof.

SUMMARY OF THE INVENTION

These and other objects are attained through the provision of a latex comprising the interpolymerization product of (A) at least one monovinylidene aromatic hydrocarbon, (B) at least one alpha, beta-ethylenically unsaturated carboxylic acid and (C) at least one compound having two olefinic group non-conjugated to each other (hereinafter called "nonconjugated diolefin(s),") wherein the polymer particles of the latex comprise 60 to 90 weight percent of an inner polymer composition and from 40 to 10 weight percent of an outer polymer composition oriented to the surface of the particles; said inner polymer composition being a polymer of from 65 to 100 mol percent of (A), from zero to 3 mol percent of (C) with the remainder if any being (B); said outer polymer composition being as interpolymer of from 24 to 70 mol percent of (B) and from 0.6 to 3.0 mol percent of (C) with the balance being (A).

The following examples are set forth to illustrate more clearly the principle and practice of this invention to those skilled in the art and are not to be construed as limitations thereof. Unless otherwise noted, where parts or quantities are mentioned, they are parts or quantities by weight.

EXAMPLE I

Kettle charge

| Component: | Parts |
|---|---|
| Water | 48.1 |
| Sodium alkyl benzene sulfonate | 0.5 |
| Potassium persulfate | 0.02 |
| Tetrasodium pyrophosphate | 0.02 |

Initiator premix

| | Parts |
|---|---|
| Potassium persulfate | 0.4 |
| Water | 6.0 |

Emulsifier premix

| | Parts |
|---|---|
| Water | 3.0 |
| Sodium alkyl benzene sulfonate | 1.5 |

Monomer Premix I

| | Parts |
|---|---|
| Styrene | 31.4 |
| Methacrylic acid | 0.4 |

Monomer Premix II

| | Parts |
|---|---|
| Styrene | 5.5 |
| Methacrylic acid | 2.4 |
| Divinylbenzene | 0.1 |

Post addition

| | Parts |
|---|---|
| 28% NH$_4$OH | 0.6 |

The kettle charge is added to a glass-lined reaction vessel fitted with a reflux condenser and a stirrer and refluxed (at atmospheric pressure) for 15 minutes to deoxygenate the solution. There is then added to the reaction vessel 0.52 part of the initiator solution. The balance of the initiator solution is added to the reaction vessel at a uniform rate of 0.026 part per minute. As soon as the initial amount of initiator solution is added to the reaction vessel, Monomer Premix I is added to the reaction vessel at a uniform rate of 0.27 part per minute, the time of addition for this monomer charge being about 120 minutes. About 30 minutes after the start of Monomer Premix I, the emulsifier solution is added to the reaction vessel at a uniform rate of 0.051 part per minute, the time of addition of this material being about 95 minutes. About 15 minutes after the completion of addition of Monomer Premix I, Monomer Premix II is added to the reaction vessel at a uniform rate of 0.135 part per minute, the total time of addition of this monomer charge being about 60 minutes. During the addition of Monomer Premix II the rate of addition of initiator solution is reduced to about 0.021 part per minute. After the addition of all monomers, the initiator solution rate of addition is increased to about 0.11 part per minute, the total time of addition of initiator solution being about 205 minutes. Reflux is continued for an additional 15 minutes to polymerize the residual monomers. The resulting latex is then cooled to about 20–30° C. at which time the pH of the latex is adjusted to about 7 with NH$_4$OH.

This latex, identified as Latex A has a solids content of 40%, a Brookfield viscosity of 20 centipoises and an average particle size of about 0.2 micron.

The catalyst concentration and monomer addition times described in the paragraph above are selected so that the monomers polymerize at substantially the rate they are added to the reaction vessel. It will be specifically noted that Monomer Premix II containing the diolefin and the acid monomer, i.e., methacrylic acid, is not introduced into the polymerization reaction until approximately 80% of the total monomer charge has been polymerized. The amount of acid in the polymer oriented to the surface of the particles so produced constitutes about 30 weight percent or 35.4 mol percent of the polymer so oriented to the surface whereas the diolefin constitutes about 1.25 weight percent or 1.0 mol. percent of the polymer so oriented to the surface.

EXAMPLE II

Test the stability of Latex A in liquid detergents maintained at a pH in the range of about 3–10 by diluting aliquots of the latex to 4–8% solids, adding these diluted aliquots with agitation to various clear, liquid detergents (designated as Detergents A–D) to form opacified detergents containing about 0.4–1.0% latex solids, and maintaining the opacified detergents at various temperatures for various lengths of time to determine when the opacified detergents show the first sign of instability of the latex therein.

The results of the tests are shown below. In this tabulation, a plus sign following an integer simply indicates that there is still no flocculation or other sign of instability at the end of the indicated number of days allowed for that particular test. A latex is regarded as having sufficiently good stability for use in opacifying detergents when it is stable in the detergent for at least 7 days at temperatures ranging from the extremes in the range from 25 to 145° F. and at least 30 days at the milder temperatures ranging from 50 to 100° F.

| | Detergent | pH | Temperature, ° F. | Days to Instability |
|---|---|---|---|---|
| Sample: | | | | |
| 1 | A | 3.1 | 25 | 30+ |
| 2 | A | 3.1 | 72 | 30+ |
| 3 | A | 3.1 | 145 | 30+ |
| 4 | B | 5.0 | 25 | 30+ |
| 5 | B | 5.0 | 72 | 30+ |
| 6 | B | 5.0 | 145 | 30+ |
| 7 | C | 6.1 | 145 | 30+ |
| 8 | C | 6.1 | 72 | 30+ |
| 9 | C | 7.8 | 145 | 30+ |
| 10 | C | 7.8 | 72 | 30+ |
| 11 | D | 6.0 | 72 | 30+ |
| 12 | D | 6.0 | 145 | 30+ |
| 13 | D | 8.5 | 72 | 30+ |
| 14 | D | 8.5 | 72 | 30+ |
| 15 | D | 10.0 | 72 | 30+ |
| 16 | D | 10.0 | 145 | 30+ |

EXAMPLE III

Prepare five latices by essentially repeating the procedure of Example I except for varying the Monomer Premix I and Monomer Premix II, so as to illustrate the variation in composition that one may use in the practice of this invention.

| Latex | Monomer Premix I | | Monomer Premix II | |
|---|---|---|---|---|
| | Composition | Parts | Composition | Parts |
| B | Styrene | 32.0 | Styrene | 5.6 |
| | | | Methacrylic acid | 2.4 |
| | | | Divinyl benzene | 0.1 |
| C | Styrene | 31.6 | Styrene | 5.5 |
| | Methacrylic acid | 0.4 | Methacrylic acid | 2.4 |
| | | | Divinyl benzene | 0.05 |
| D | Styrene | 31.6 | Styrene | 7.0 |
| | Methacrylic acid | 0.4 | Methacrylic acid | 1.0 |
| | | | Divinyl benzene | 0.1 |
| E | Styrene | 24 | Styrene | 13.5 |
| | | | Methacrylic acid | 2.4 |
| | | | Divinyl benzene | 0.1 |
| F | Styrene | 22.0 | Styrene | 5.5 |
| | Methacrylic acid | 9.6 | Methacrylic acid | 2.4 |
| | Divinyl benzene | 0.4 | Divinyl benzene | 0.1 |

The product of each of the reactions is an aqueous latex of interpolymer particles averaging about 0.2 micron in diameter. In each latex, the particles have been prepared so that the acid/diolefin component is oriented to the surface of the particle thereby imparting stability to the latex.

When tested for stability in liquid detergents as in Example II, latices B and F show stability which is comparable to that shown by Latex A when tested over a pH range of 3.0–10.0 and at temperatures of from 25° to 145° F.

Latex F is included to illustrate the use of carboxylic acid and diolefin in the preparation of both the inner and outer portions of the polymer particle and to illustrate a terpolymer latex wherein particles have a homogeneous composition throughout.

The useful pH range of these latices is from about 2 to about 11 and more preferably, from 3–10.

Latices C, D and E were prepared to show the criticality involved in choosing the proper amounts of diolfin and acid. The following table illustrates the poor stability of these latices.

TABLE 1.—STABILITY OF LATICES C, D, AND E

| Latex | Detergent | pH | Temperature, ° F. | Days to instability |
|---|---|---|---|---|
| C (a) | C | 6.0 | 72 | 1 |
| (b) | C | 6.0 | 145 | 1 |
| (c) | C | 7.0 | 72 | 30+ |
| (d) | C | 7.0 | 145 | 30+ |
| (e) | D | 6.0 | 72 | 30+ |
| (f) | D | 6.0 | 145 | 5 |
| D (a) | C | 6.0 | 72 | 1 |
| (b) | C | 6.0 | 145 | 1 |
| (c) | C | 8.0 | 72 | 1 |
| (d) | C | 8.0 | 145 | 1 |
| E (a) | C | 8.0 | 72 | 1 |
| (b) | C | 8.0 | 145 | 1 |
| (c) | D | 6.0 | 72 | 1 |
| (d) | D | 6.0 | 145 | 1 |

Latex C, which is similar to Latex A except for the amount of diolefin used in the preparation of the latex, shows a marked decrease in stability over that shown by Latex A. This is due to the difference in the amount of diolefin present in Monomer Premix II which is the portion which is oriented to the outer surface of the polymer particle. Latex A has 1.25 weight percent or 1.0 mol percent of the diolefin component in the outer portion of the particle which is oriented to the surface whereas Latex C only has 0.63 weight percent or 0.51 mol percent. Thus, detergent stability will not result where the monomers used to prepare the outer portion of the polymer particles do not contain sufficient diolefin. Experiments in this regard indicate that the outer portion of the particles should be prepared using at least 0.6 mol percent diolefin.

Latex D, which is similar to Latex A except for the amount of carboxylic acid monomer used to prepare the latex, shows a substantial decrease in stability over that shown by Latex A. This is due to the difference in the amount of carboxylic acid monomer present in the Monomer Premix II, which is the portion that is oriented to the outer surface of the polymer particle.

Latex A has 30 weight percent or 35.4 mol percent of the carboxylic acid component in the outer portion of the particle which is oriented to the surface whereas Latex D only has 12.5 weight percent or 14.7 mol percent of carboxylic acid component oriented to the surface. Latex E is similar to Latex D in that Latex E has only 18.2 mol percent of carboxylic acid component in the outer composition. Thus, detergent stability will not result where the monomers used to prepare the outer portion of the polymer particles do not contain sufficient carboxylic acid monomer. Experiments in this regard indicate that the outer portion of the particles should be prepared using at least 24 mol percent of carboxylic acid monomer.

It will be specifically noted that the monomers so added to the reaction kettle are added at such a rate that they polymerize at a rate substantially equal to the rate at which they are added to the reaction vessel. It will be further noted that the carboxylic acid monomer, which may constitute from about 24 to about 70 mol percent of the second monomer charge, is not added until all of the total Monomer Premix I has been polymerized.

Polymerization can be conducted by conventional emulsion polymerization techniques, e.g., at temperatures in the range of about 30–150° C. under subatmospheric, atmospheric, or superatmospheric pressure, using conventional free radical polymerization initiators, emulsifying agents, and, if desired, aids such as buffers, particle size regulators, activators, etc. Ordinarily, the amount of water employed is such that the latices have solids contents in the range of about 35–45%, but latices of any solids content are contemplated.

DESCRIPTION OF PREFERRED EMBODIMENTS

This invention is directed to an emulsion polymerized latex of (A) at least one monovinylidene aromatic hydrocarbon, (B) at least one alpha, beta-ethylenically unsaturated carboxylic acid and (C) at least one nonconjugated diolefin; wherein the polymer particles comprise an inner polymer composition and a particular outer polymer composition which is oriented to the surface of the polymer particles.

The scope of this invention contemplates using a homogeneous monomeric charge to prepare polymeric particles which have a substantially uniform composition through the particle, as illustrated by Latex F.

The latices of this invention may also be prepared by a batch polymerization process wherein the inner composition is prepared batch-wise followed by polymerization of the outer composition onto the previously prepared inner composition. An alternative method would be a continuous polymerization process wherein the monomeric components are fed into the polymerization vessel simultaneously, whereby the amount of each type monomer may be enriched or depleted as polymerization conditions demand.

Another embodiment of this invention comprises forming the polymer particles using at least two different monomeric charges wherein at least part, if not all, of either or both of the acid monomer and the diolefin are withheld from the polymerization vessel until from 60–90 percent by weight and preferably 75–85 percent by weight of the inner composition has been formed. After the polymerization of what is to be the inner composition of the particle, the last 10–40 percent by weight of monomer charge containing acid monomer and diolefin is added to the vessel and polymerized around the particles already formed.

The inner polymer composition may be a homopolymer of the monovinylidene aromatic hydrocarbon and principally styrene or an interpolymer of at least 65 mol percent thereof and up to 3 mol percent of the nonconjugated diolefin with any remainder being the acid monomer.

Thus, the more expensive acid and diolefin components are oriented to the outer surface of the polymer particles, where they act to impart stability to the latex. In this embodiment, the final 10–40 percent by weight of monomer charge should comprise from 24 to 70 mol percent of acid monomer and from 0.6–3 mol percent of diolefin. In the more preferable embodiment, the final 15–25 percent by weight of monomer charge should comprise from 30–50 mol percent of acid monomer and from 0.8–2.0 mol percent of diolefin.

In the practice of this invention, the polymer particles so prepared have a particle size of 0.05–0.5 and more preferably 0.1–0.3 micron.

The critical feature of this invention is that the polymer composition oriented to the surface of the polymer particles must contain the proportions of the carboxylic acid and the diolefin set forth above. It is this critical feature and the makeup of the polymer particles that provides the unique properties of opacifying latices which are stable over a pH range of from about 2 to about 11.

The acid employed as a component of the monomer charge can be any polymerizable alpha,beta-ethylenically unsaturated carboxylic acid. Preferably, one would use a monocarboxylic acid such as acrylic, methacrylic, cinnamic, atropic, or crotonic acid. Other utilizable acids include, e.g., maleic acid, itaconic acid, half esters of maleic and fumaric acids, such as the methyl, butyl and dodecyl acid maleates and fumarates, etc. Mixtures of such acids can be employed if desired.

The nonconjugated diolefins employed in the practice of this invention are compounds which have two nonconjugated ethylenically unsaturated double bonds per molecule, such that both double bonds react readily causing the diolefin to interpolymerize with the other monomers used in the practice of this invention. Preferably, these diolefins have two ethylenically unsaturated double bonds with about the same degree of reactivity in order to insure that both double bonds react and enter into the polymerization of these polymer particles. Furthermore, the double bonds in the diolefin should have a reactivity ratio, as measured by Q and e values, which is comparable to the reactivity ratio of the carboxylic acid and vinylidene monomers used. This is necessary in order to insure random distribution of the diolefin throughout the polymer particles. These diolefins may be aliphatic, aromatic, aliphatic-aromatic, heterocyclic, cycloaliphatic, etc. Examples of suitable diolefins would include divinyl benzene, ethylene dimethacrylate, ethylene glycol dimethacrylate, triethylene glycol, dimethacrylate, tetraethylene glycol dimethacrylate, polyethylene glycol dimethacrylate, allyl methacrylate, diallyl fumarate, cyclohexyl methacrylate, cyclol acrylate, vinyl crotonate, and nonconjugated alpha, omega diolefins of at least 5 carbon atoms such as 1,4-pentadiene, 1,7-octadiene, etc. Divinyl benzene is the preferred diolefin.

Suitable monovinylidene aromatic hydrocarbons and ar-alkyl and ar-halo derivatives thereof include such as styrene, vinyl naphthalene, alpha-methylstyrene, ortho, meta, and para-methylstyrenes, alpha-methyl-para-methylstyrene, para-tertiary-butylstyrene, 2,4-dimethylstyrene, ortho, meta, and para-chlorostyrenes, 2,5-dichlorostyrene, 2-methyl-4-chlorostyrene, etc., and mixtures thereof with one another.

In a preferred embodiment, the inner polymer composition of the polymer particles will be a homopolymer or interpolymer of styrene wherein the interpolymers contain at least 90 weight percent of styrene with the balance being a monocarboxylic acid such as methacrylic acid, etc.

The monomers can be polymerized by any of the known emulsion polymerization processes provided only that the aforementioned critical amounts of carboxylic acid component and diolefin component in the outer portion of the polymer particle are observed.

The latices of this invention are particularly useful as opacifiers for products which are to be maintained at a pH in the range of about 2 to about 11. In this application, the amount of latex employed varies, e.g., with the degree of opacification desired but is usually such as to give a composition containing about 0.4–2% latex solids. Prior to use in this and other applications, the latices are usually stored at a pH of about 7.

It is obvious that many variations can be made in the products and processes set forth above without departing from the spirit and scope of this invention.

What is claimed is:

1. A latex comprising the interpolymerization product of (A) at least one monovinylidene aromatic hydrocarbon, (B) at least one alpha, beta-ethylenically unsaturated carboxylic acid and (C) at least one compound having two olefinic groups nonconjugated to each other, wherein the polymer particles of the latex comprise from 60 to 90 weight percent of an inner polymer composition and correspondingly from 40 to 10 weight percent of an outer polymer composition oriented to the surface of the particles; said inner polymer composition being a polymer of from 65 to 100 mol percent of (A), from zero to 3 mol percent of (C) with the remainder if any being (B); said outer polymer composition being an interpolymer of from 24 to 70 mol percent of (B) and from 0.6 to 3.0 mol percent of (C) with the balance being (A).

2. The latex of claim 1 wherein the monovinylidene aromatic hydrocarbon is styrene.

3. The latex of claim 1 wherein the alpha, beta- ethylenically unsaturated carboxylic acid is methacrylic acid.

4. The latex of claim 1 wherein (C) is divinyl benzene.

5. The latex of claim 1 wherein the outer polymer composition is an interpolymer of styrene, methacrylic acid and divinyl benzene.

6. The latex of claim 5 wherein the outer polymer composition which is oriented to the surface of the polymer particles comprises from 15 to 25 weight percent of the polymer particle.

7. A process for the preparation of a latex comprising the interpolymerization product of (A) at least one monovinylidene aromatic hydrocarbon, (B) at least one alpha, beta-ethylenically unsaturated carboxylic acid and (C) at least one compound having two olefinic groups nonconjugated to each other, wherein the polymer particles of the latex comprise from 60 to 90 weight percent of an inner polymer composition and correspondingly from 40 to 10 weight percent of an outer polymer composition oriented to the surface of the particles; which process comprises polymerizing in aqueous emulsion from 65 to 100 mol percent of (A), from zero to 3 mol percent of (C) with the remainder if any being (B) to form the inner polymer composition, adding a mixture of from 24 to 70 mol percent of (B) and from 0.6 to 3 mol percent of (C) with the balance being (A) and polymerizing to form the outer polymer composition.

8. An opacified detergent wherein the opacifier is a latex comprising the interpolymerization product of (A) at least one monovinylidene aromatic hydrocarbon, (B) at least one alpha, beta-ethylenically unsaturated carboxylic acid and (C) at least one compound having two olefinic groups nonconjugated to each other, wherein the polymer particles of the latex comprise from 60 to 90 weight percent of an inner polymer composition and correspondingly from 40 to 10 weight percent of an outer polymer composition oriented to the surface of the particles; said inner polymer composition being a polymer of from 65 to 100 mol percent of (A), from zero to 3 mol percent of (C) with the remainder if any being (B); said outer polymer composition being an interpolymer of from 24 to 70 mol percent of (B) and from 0.6 to 3.0 mol percent of (C) with the balance being (A).

References Cited

UNITED STATES PATENTS

| | | | |
|---|---|---|---|
| 3,244,655 | 4/1966 | Sullivan et al. | 260—29.6 |
| 3,340,217 | 9/1967 | Woodruff | 260—29.7 |

MORRIS LIEBMAN, Primary Examiner

H. H. FLETCHER, Assistant Examiner

U.S. Cl. X.R.

252—89; 260—29.6, 80.6, 80.7, 880